United States Patent
Lish et al.

(10) Patent No.: US 8,129,964 B2
(45) Date of Patent: Mar. 6, 2012

(54) INTERLEAVED/ALL-PHASE MODE SWITCHED PWM SYSTEM

(75) Inventors: Charles A. Lish, Nashua, NH (US); Duy Pham, Phoenixville, PA (US)

(73) Assignee: Integrated Device Technology Inc., San Jose, CA (US)

( * ) Notice: Subject to any disclaimer, the term of this patent is extended or adjusted under 35 U.S.C. 154(b) by 414 days.

(21) Appl. No.: 12/502,425

(22) Filed: Jul. 14, 2009

(65) Prior Publication Data

US 2011/0012574 A1    Jan. 20, 2011

(51) Int. Cl.
*G05F 1/40* (2006.01)
(52) U.S. Cl. ........................................ 323/272
(58) Field of Classification Search .................. 323/225, 323/268, 271, 272, 282, 284, 285; 363/65
See application file for complete search history.

(56) References Cited

U.S. PATENT DOCUMENTS

| | | | |
|---|---|---|---|
| 6,198,261 B1 * | 3/2001 | Schultz et al. | 323/272 |
| 6,232,754 B1 * | 5/2001 | Liebler et al. | 323/272 |
| 6,356,063 B1 | 3/2002 | Brooks | |
| 6,605,931 B2 | 8/2003 | Brooks | |
| 6,696,825 B2 | 2/2004 | Harris et al. | |
| 7,023,182 B1 | 4/2006 | Kleine et al. | |
| 7,026,798 B2 * | 4/2006 | Cheung et al. | 323/225 |
| 7,026,800 B2 | 4/2006 | Liu et al. | |
| 7,161,332 B1 | 1/2007 | Kleine et al. | |
| 2010/0268969 A1 * | 10/2010 | Rui | 713/300 |
| 2011/0101940 A1 * | 5/2011 | Kudo | 323/282 |

* cited by examiner

*Primary Examiner* — Matthew Nguyen
(74) *Attorney, Agent, or Firm* — Panitch, Schwarze, et al.

(57) ABSTRACT

A multi-phase power switching converter having first and second states includes a pulse width modulator having an output, a converter output providing an output signal, and a plurality of drivers, each having an output electrically coupled to the converter output and an input. When the converter is in the first state where a duty cycle of the converter is less than or equal to 100 divided by the number of drivers, each of the driver inputs is configured to be sequentially electrically coupled to the pulse width modulator output. When the converter is in the second state where the duty cycle of the converter is greater than 100 divided by the number of drivers, each of the driver inputs is simultaneously electrically coupled to the pulse width modulator output.

9 Claims, 5 Drawing Sheets

INTERLEAVED/ALL-PHASE MODE SWITCHED PWM SYSTEM

BACKGROUND OF THE INVENTION

An embodiment of the present invention relates generally to multi-phase power switching converters, and more particularly, to multi-phase power switching converters having an interleaved mode for normal operating conditions and an all-phase mode for navigating transient conditions while maintaining adequate closed loop control.

Multi-phase power switching converters are often used in applications for receiving an input voltage source and outputting a shifted level voltage source. A plurality of output drivers may be connected to a single pulse width modulator (PWM). In addition, normal operating conditions for converters require the use of low duty cycles. Accordingly, a time division multiplexer (TDM) may be provided to separately and sequentially switch "on" and "off" each of the drivers to drive the output of the converter. Each of the drivers may be referred to as a "phase branch" of the converter.

The output voltage is determined by a maximum allowable duty cycle of the converter, which is determined by dividing the number of drivers into 100 (e.g., a three driver system has a 100/3 or 33⅓% duty cycle). During operation, the converter may encounter transient loading conditions, yielding slight deviations from the steady state of the output voltage. Often a transient condition will require the converter to exceed the maximum allowable duty cycle, which presents a problem for TDM-controlled converters.

One solution for negotiating transient conditions utilizes an empirical algorithm to hard-switch on all of the phase branches not, for that instant, selected by the TDM simultaneously with the TDM selected branch. Unfortunately, the phase branches in this approach are not subject to a closed loop transfer function that allows the transient response to be well-controlled.

It is desirable to provide a converter that satisfies system requirements for low duty cycles while maintaining well controlled closed loop feedback dynamics during the handling of transient conditions where the maximum allowable duty cycle of the converter must be exceeded.

BRIEF SUMMARY OF THE INVENTION

Briefly stated, an embodiment of the present invention comprises a multi-phase power switching converter having first and second states. The converter includes a pulse width modulator having an output, a converter output providing an output signal, and a plurality of drivers, each having an output electrically coupled to the converter output and an input. When the converter is in the first state where a duty cycle of the converter is less than or equal to 100 divided by the number of drivers, each of the driver inputs is configured to be sequentially electrically coupled to the pulse width modulator output. When the converter is in the second state where the duty cycle of the converter is greater than 100 divided by the number of drivers, each of the driver inputs is simultaneously electrically coupled to the pulse width modulator output.

Another embodiment of the present invention comprises a multi-phase power switching converter having first and second states. The converter includes a pulse width modulator having an output, a converter output providing an output signal, and a plurality of drivers, each having an output electrically coupled to the converter output and an input. A time division multiplexer has an input electrically coupled to the pulse width modulator output and a plurality of outputs each corresponding and coupled to a respective driver input. A phase-mode selector has an input configured to receive an error signal. A switch bank is coupled to the pulse width modulator output and has a plurality of switches corresponding to respective ones of the plurality of driver inputs. The plurality of switches are all open in the first state such that each of the driver inputs is configured to be sequentially electrically coupled to the pulse width modulator output by the time-division multiplexer. In the second state entered by the converter upon the error signal being equal to a predetermined threshold value, the plurality of switches are each closed to electrically couple each of the driver inputs to the pulse width modulator output.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Figure 1:
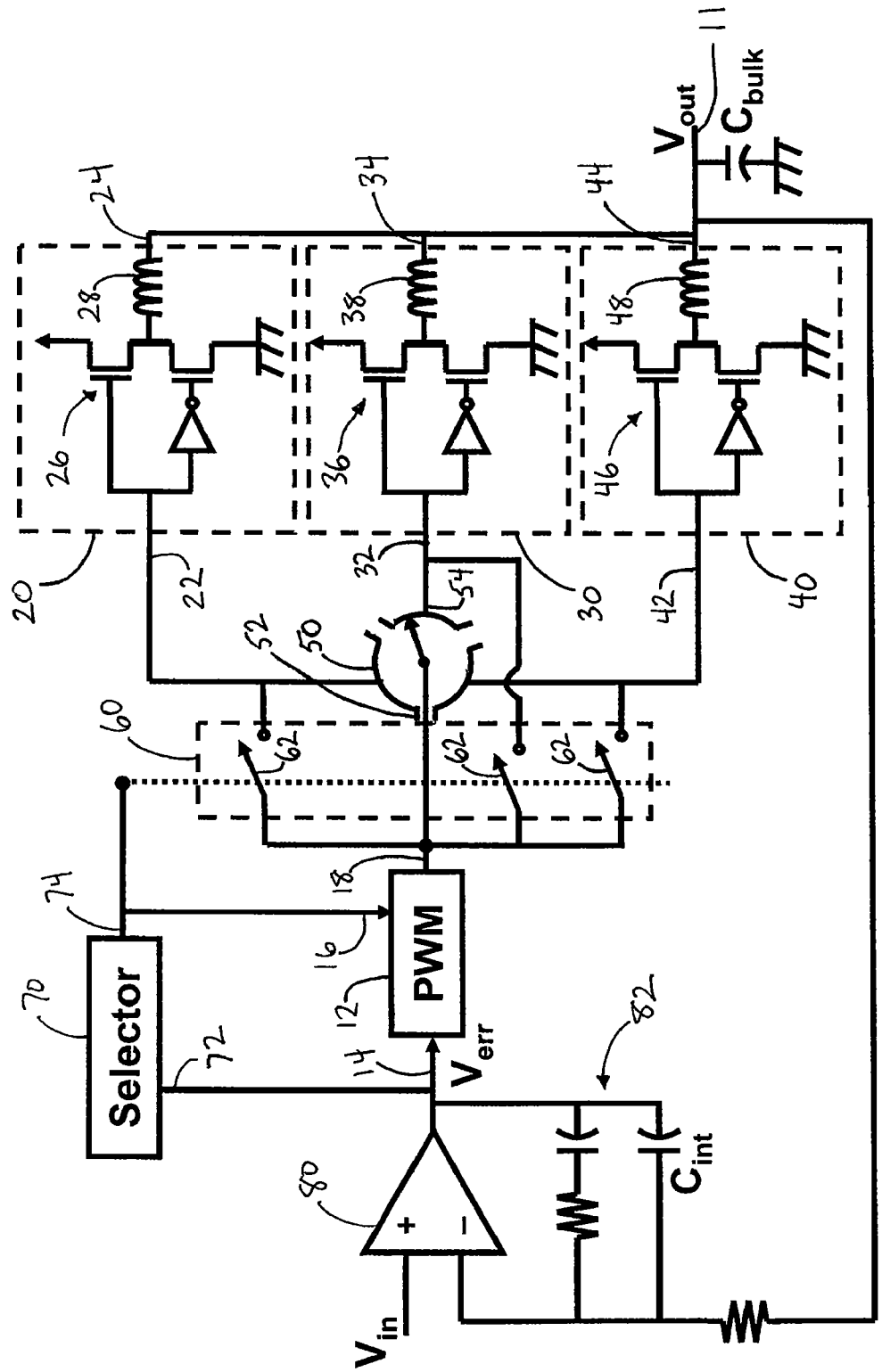
FIG. 1 is a schematic partial block diagram of a multi-phase power switching converter in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail, wherein like reference numerals indicate like elements throughout, there is shown in FIG. 1 a preferred embodiment of a multi-phase power switching converter 10 having a PWM 12, which may be of a conventional type. The PWM 12 preferably includes an output 18 and two inputs 14, 16. The converter 10 also includes a plurality of drivers 20, 30, 40, each having an output 24, 34, 44 electrically coupled to a converter output 11, and having an input 22, 32, 42. Although FIG. 1 and the description below describe an embodiment of the converter 10 having three drivers, any number of drivers may be selected as necessary.

The first driver 20 preferably includes a metal-oxide-semiconductor (MOS) pair 26 wherein each of the devices of the MOS pair has a gate coupled to the driver input 22. Though the MOS pair 26 is shown in FIG. 1 as a pair of NMOS devices or transistors, one skilled in the art will recognize that other configurations may be utilized, such as a CMOS structure that includes two CMOS devices or transistors. An output of the MOS pair 26 is coupled to the driver output 24 through an inductor 28. Although the drivers 20, 30, 40 are shown in FIG. 1 as having identical configurations, one skilled in the art would appreciate that one or more of the drivers 20, 30, 40 may be differently configured. Additionally, one or more of the drivers 20, 30, 40 may be coupled to different power supplies or the like.

The converter 10 also includes a TDM 50 with an input 52 electrically coupled to the PWM output 18. An output 54 of the TDM 50 is configured to sequentially electrically couple to each of the driver inputs 22, 32, 42 during operation. Accordingly, a signal output by the PWM 12 is sequentially applied to the input of each of the drivers 20, 30, 40 in a timed, sequential basis. The TDM 50 is shown in FIG. 1 as an analog rotary dial, but may be implemented using other conventional analog or digital components or configurations.

A switch bank 60 is also coupled to the PWM output 18. In the embodiment shown in FIG. 1, the switch bank 60 preferably has a plurality of switches 62, with each switch 62 corresponding to respective ones of the plurality of driver inputs 22, 32, 42. However, other configurations may be utilized. The switch bank 60 is configured to receive a control signal from a phase-mode selector 70. The phase-mode selector 70 has an input 72 and an output 74, which is coupled to the second PWM input 16 and also provides the control signals to the switch bank 60.

Operation of the converter 10 will now be described. The converter 10 operates in first and second states. In the first state, an output voltage $V_{out}$ at the converter output 11 is generally equal to an input voltage $V_{in}$ multiplied by the duty cycle. In the example of FIG. 1, the maximum duty cycle is 100 divided by the number of drivers (3), or approximately 33⅓%. The converter 10 operates in the first state when the duty cycle is less than the permitted maximum, i.e., less than 33⅓%.

Figure 2:
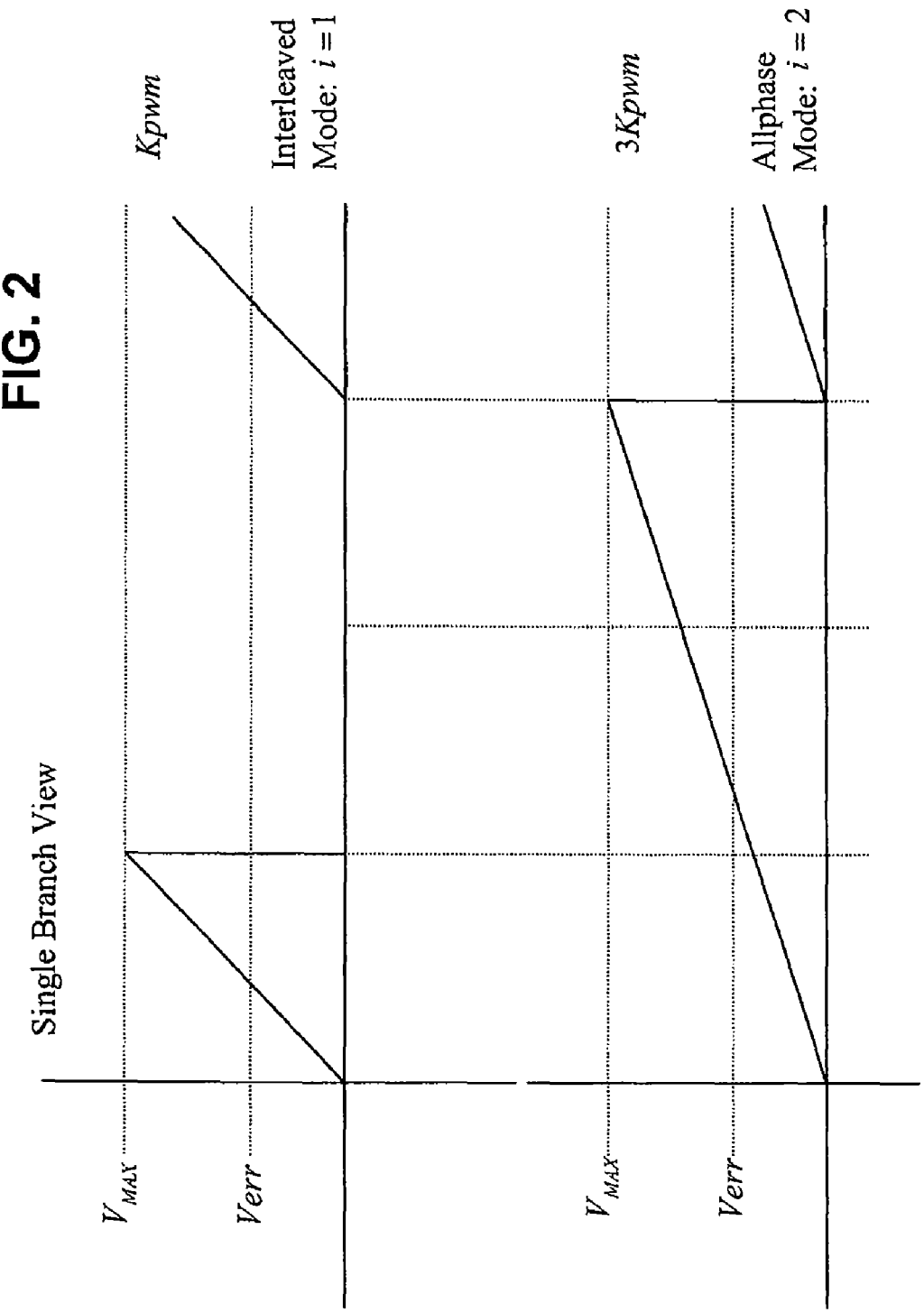
FIG. 2 is a plot of the PWM waveform for interleaved and all-phase modes of the converter of FIG. 1.

An error amplifier 80 outputs an error signal $V_{err}$, which is dominated by a voltage across an integrating capacitor $C_{int}$ of a voltage transfer function filter 82. The error signal $V_{err}$ is supplied to the first PWM input 14 and the phase-mode selector input 72. In the first state, the PWM 12 outputs a first waveform. The waveform may be a sawtooth, sine wave, or the like. In the first state, the TDM 50 sequentially couples each of the driver inputs 22, 32, 42 to the PWM output 18. The top plot of FIG. 2 shows a single branch of a sawtooth waveform received at one of the drivers 20, 30, 40 from the PWM 12. The actual waveform at the PWM output 18 will repeat the sawtooth for each of the three intervals so that a different driver 20, 30, 40 will receive the waveform during each different time interval.

When the converter 10 encounters a transient which calls for a duty cycle exceeding the allowed maximum (e.g., 33⅓% for FIG. 1), the converter 10 is configured to enter the second state. The second state is triggered by receipt at the selector 70 of an error signal $V_{err}$ greater than or equal to a predetermined maximum voltage $V_{MAX}$. In response, the selector 70 outputs an all-phase mode signal to the switch bank 60 and to the second PWM input 16. The PWM 12 then alters the output waveform to conform with the second state. For example, the bottom plot of FIG. 2 shows an output waveform in the second state being a sawtooth with a 33⅓% lower slope and rising over all three time intervals. As a result, the gain in the second state is increased three-fold. At the switch bank 60, the switches 62, which were all in an open position in the first state, are each placed into the closed position for the second state. With all of the switches 62 closed, all of the drivers 20, 30, 40 are accordingly simultaneously electrically coupled directly to the PWM output 18 and the TDM 50 is bypassed.

The first state is restored by negation of the all-phase mode signal from the selector 70, thereby opening all of the switches 62 and causing the PWM 12 to restore the original waveform (e.g., top plot of FIG. 2). Negation of the all-phase mode signal is triggered by the error signal $V_{err}$ dropping below a predetermined threshold, such as below ⅓ of the predetermined maximum voltage $V_{MAX}$.

Figure 5:
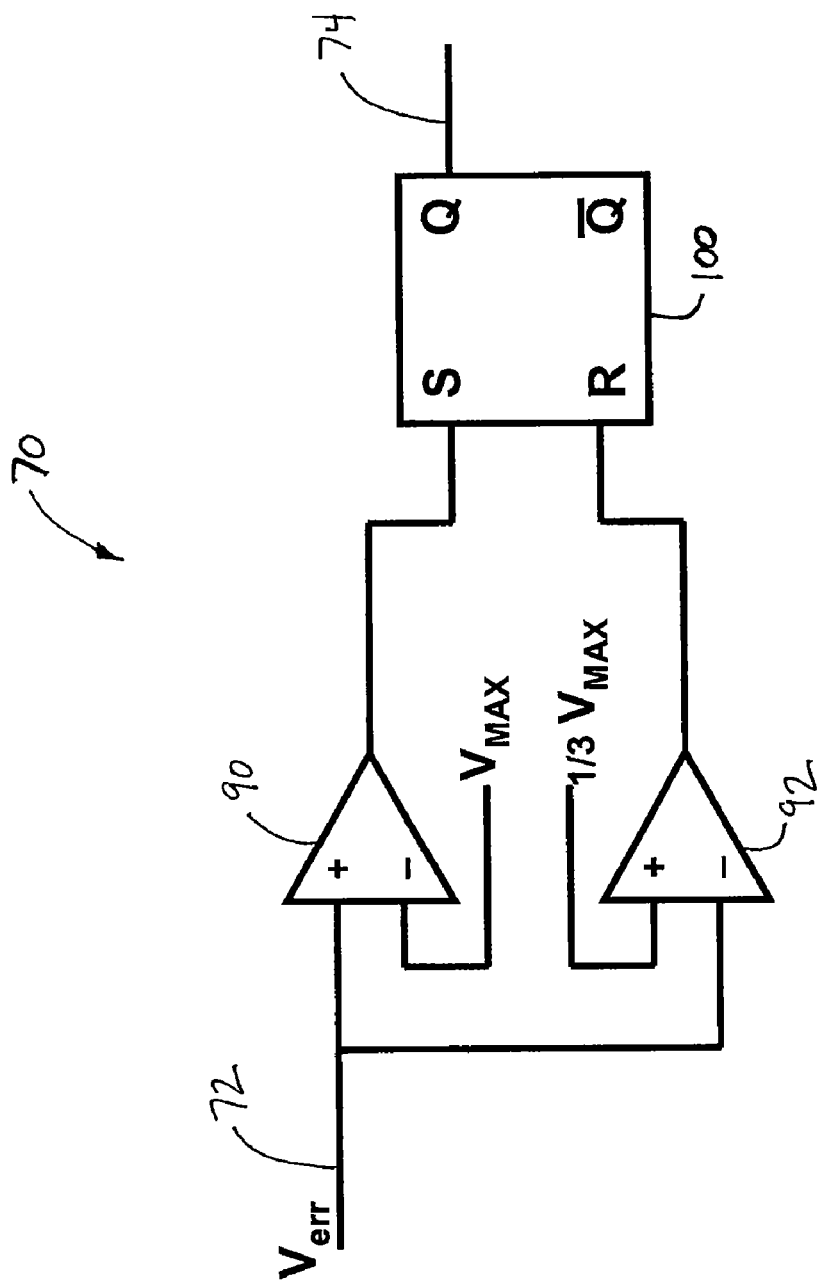
FIG. 5 is a schematic diagram of the phase mode selector from FIG. 1.

The phase-mode selector 70 therefore is responsible for determining if the converter 10 is placed into the first or the second state. FIG. 5 shows one possible configuration of the selector 70. The input 72 is coupled to a plurality of comparators (only two shown) 90, 92. Preferably, the error signal $V_{err}$ is received at the non-inverting input of the first comparator 90 and at the inverting input of the second comparator 92. The inverting input of the first comparator 90 receives the predetermined maximum voltage $V_{MAX}$ while the non-inverting input of the second comparator 92 receives the predetermined threshold (e.g., ⅓ $V_{MAX}$). The comparators 90, 92 may also be digital rather than analog. Outputs of the comparators 90, 92 are coupled to a bistable multivibrator, preferably a set/reset (SR) latch 100, which outputs the all-phase mode signal in accordance with the conditions described above.

Although the above example is described using comparisons of the error signal $V_{err}$ to certain predetermined thresholds, embodiments of the present invention also contemplate detecting duty cycle boundaries by directly timing the PWM waveform in the digital domain. This approach is conveniently compact because no additional on-chip circuitry is required if implemented with a digital core processor. By monitoring and setting limits and thresholds on the duty cycle of the PWM 12 signals via signal processing, one can directly trigger the interleaved and all-phase modes.

The differential equations for the system are as follows:

$$\text{Let } x \in R^n \text{ and } A_i \in R^{n \times n}$$
$$\text{For } Verr > V_{MAX}^- \text{ and } i = 1 \rightarrow i = 2, \dot{x} = A_2 x$$
$$Verr < \frac{1}{3} V_{MAX} \text{ and } i = 2 \rightarrow i = 1, \dot{x} = A_1 x$$

The number of state variables in the equations is n. The equations are in homogenous form, conforming to the requirements for using a Lyapunov method (or close variant) for dynamical analysis. The form is achieved by translating the state variable origin to match the final transient setting value. To better illustrate, FIG. 3 is a subset state space diagram of a bulk voltage $V_O$ (which, ignoring equivalent series resistance (ESR), is the voltage across a bulk capacitor $C_{bulk}$ in FIG. 1) and the error signal $V_{err}$ serving as close approximations to strict state variables.

Figure 3:
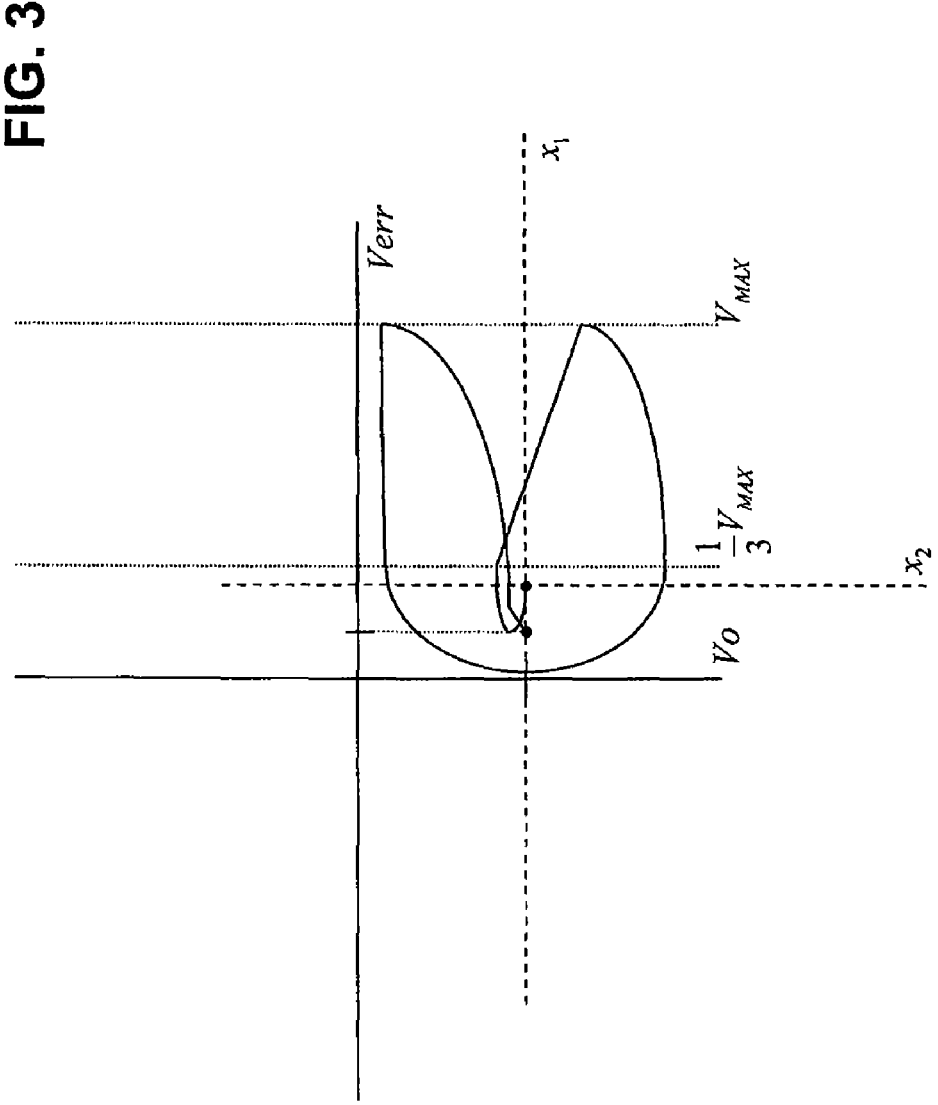
FIG. 3 is a state space diagram for the converter of FIG. 1.

The initial condition in the diagram of FIG. 3 is the point left of the translated $x_1$, $x_2$ origin. From this point, a sharp increase in the load current causes the trajectory to move such that the bulk voltage $V_O$ slightly decreases. The loop responds by increasing the error signal $V_{err}$ accompanied by an increase of the duty cycle in the PWM 12. When the error signal reaches the $V_{MAX}$ boundary, the converter 10 reaches the maximum duty cycle that can be produced in the interleaved operation of the TDM 50 (e.g., 33⅓% in FIG. 1). This triggers the change to the all-phase mode, which has a transfer function with a loop gain, for example, three times larger than the interleaved mode.

Figure 4:
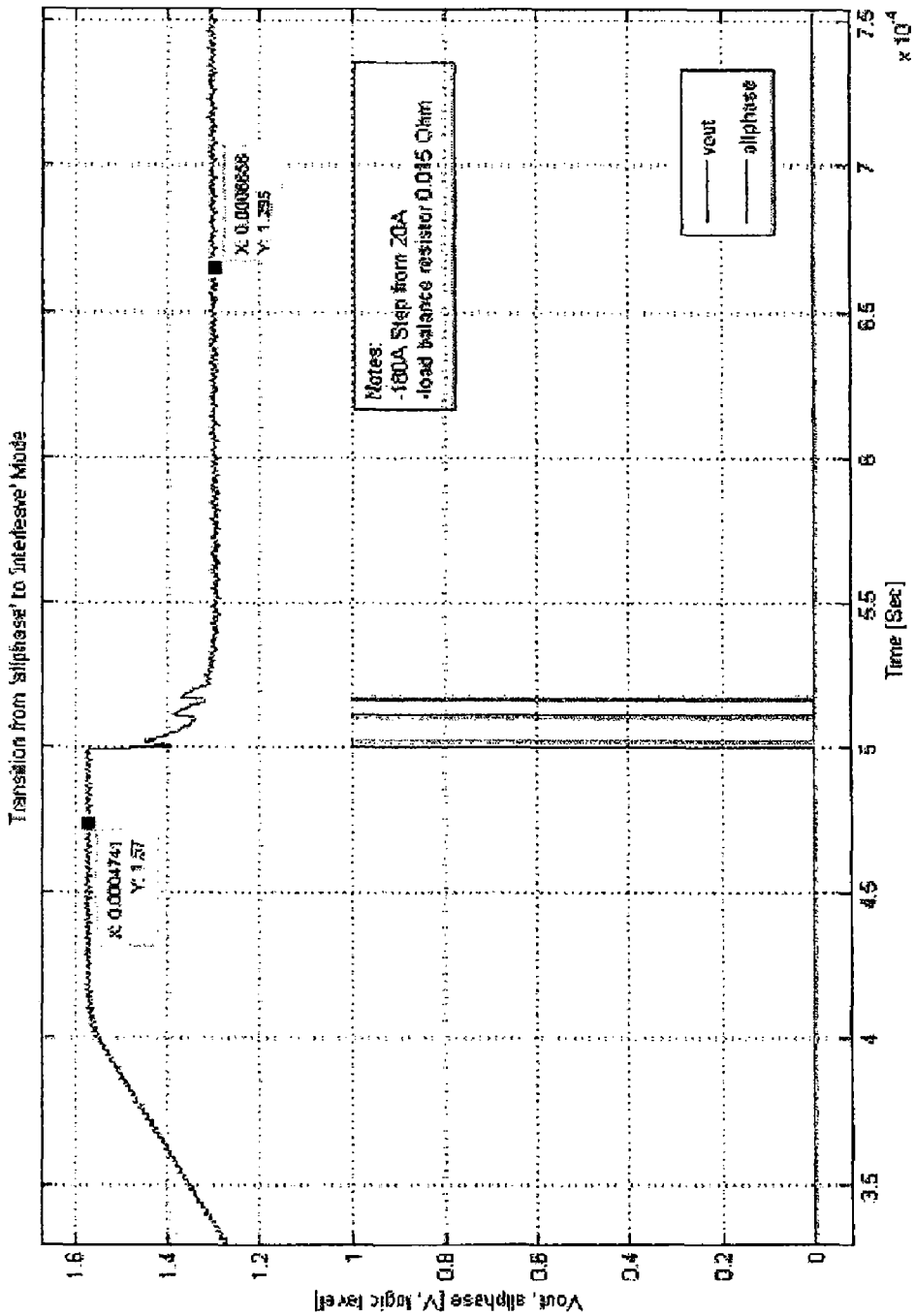
FIG. 4 is a plot of output voltage and the all-phase signal during a transition in accordance with a preferred embodiment of the present invention.

There is thus an abrupt change in slope of the trajectory as the state vector moves to the predetermined threshold (e.g., ⅓ $V_{MAX}$) boundary. Once this boundary is crossed, the loop returns to the slower interleaved mode until the $V_{MAX}$ boundary is again reached, triggering the all-phase mode change. The state vector thereafter makes a final traverse over the ⅓ $V_{MAX}$ boundary, triggers the interleaved mode, and settles at the translated $x_1$, $x_2$ origin. Validation of the dual phase mode is shown in FIG. 4, wherein the upper curve represents the output voltage $V_{out}$ during the transition and the lower curve represents the signal output by the selector 70 (logic level "1" being the all-phase mode signal).

It will be appreciated by those skilled in the art that changes could be made to the embodiments described above without departing from the broad inventive concept thereof. It is understood, therefore, that the invention is not limited to the particular embodiments disclosed, but it is intended to cover modifications within the spirit and scope of the present invention as defined by the appended claims.

We claim:

1. A multi-phase power switching converter having first and second states comprising:
    (a) a pulse width modulator having an output;
    (b) a converter output providing an output signal; and
    (c) a plurality of drivers, each having an output electrically coupled to the converter output and an input, whereby
    when the converter is in the first state where a duty cycle of the converter is less than or equal to 100 divided by the number of drivers, each of the driver inputs is configured to be sequentially electrically coupled to the pulse width modulator output, and
    when the converter is in the second state where the duty cycle of the converter is greater than 100 divided by the number of drivers, each of the driver inputs is simultaneously electrically coupled to the pulse width modulator output.

2. The converter of claim 1, further comprising:
    (d) a phase-mode selector having an input, the phase-mode selector being configured to determine whether the converter is to be placed into the first or the second state based on an error signal received at the input of the phase-mode selector, and further configured to output an all-phase mode signal if the phase-mode selector determines that the converter is to be placed into the second state; and
    (e) a switch bank configured to receive the all-phase mode signal and to switch so that each of the driver inputs is connected to the pulse width modulator output through the switch bank when the converter is in the second state.

3. The converter of claim 2, wherein the phase mode selector includes a plurality of comparators receiving the error signal and a bistable latch coupled to outputs of the plurality of comparators.

4. The converter of claim 3, wherein the plurality of comparators are one of analog comparators and digital comparators.

5. The converter of claim 2, wherein the switch bank includes a plurality of switches, each of the plurality of switches corresponding to a respective one of the plurality of drivers.

6. The converter of claim 1, wherein each of the drivers includes a metal-oxide-semiconductor (MOS) pair, each of the MOS pair having a gate coupled to the respective driver input.

7. The converter of claim 6, wherein each of the drivers further includes an inductor coupled at one end to an output of the respective MOS pair and at the other end to the respective driver output.

8. The converter of claim 1, further comprising:
    (d) a time-division multiplexer having an input electrically coupled to the pulse width modulator output, and an output, the time-division multiplexer output being configured to be sequentially electrically coupled to each of the driver inputs when the converter is in the first state and the time-division multiplexer being bypassed when the converter is in the second state.

9. A multi-phase power switching converter having first and second states comprising:
    (a) a pulse width modulator having an output;
    (b) a converter output providing an output signal;
    (c) a plurality of drivers, each having an output electrically coupled to the converter output and an input;
    (d) a time division multiplexer having an input electrically coupled to the pulse width modulator output and a plurality of outputs each corresponding and coupled to a respective driver input;
    (e) a phase-mode selector having an input configured to receive an error signal; and
    (f) a switch bank coupled to the pulse width modulator output and having a plurality of switches corresponding to respective ones of the plurality of driver inputs, whereby
    the plurality of switches are all open in the first state such that each of the driver inputs is configured to be sequentially electrically coupled to the pulse width modulator output by the time-division multiplexer, and
    in the second state entered by the converter upon the error signal being equal to a predetermined threshold value, the plurality of switches are each closed to electrically couple each of the driver inputs to the pulse width modulator output.

* * * * *